(12) United States Patent
Shorten et al.

(10) Patent No.: US 10,783,113 B2
(45) Date of Patent: Sep. 22, 2020

(54) DATA RETENTION FRAMEWORK

(71) Applicant: ORACLE INTERNATIONAL CORPORATION, Redwood Shores, CA (US)

(72) Inventors: Anthony Shorten, Victoria (AU); Shrenik Jain, Ghaziabad UP (IN)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 14/736,443

(22) Filed: Jun. 11, 2015

(65) Prior Publication Data

US 2016/0364395 A1    Dec. 15, 2016

(51) Int. Cl.
*G06F 17/00*    (2019.01)
*G06F 16/11*    (2019.01)
*G06F 16/28*    (2019.01)

(52) U.S. Cl.
CPC ......... *G06F 16/125* (2019.01); *G06F 16/113* (2019.01); *G06F 16/282* (2019.01)

(58) Field of Classification Search
CPC ......... G06F 17/30085; G06F 17/30073; G06F 17/30589; G06F 17/30221; G06F 17/30082; G06F 16/125; G06F 16/282; G06F 16/113; G06F 3/0649; G06F 11/1446
USPC ....... 707/661, 662, 663, 665, 666, 667, 668, 707/669, 670, 671, 672
See application file for complete search history.

(56) References Cited

U.S. PATENT DOCUMENTS

| 7,107,416 | B2 * | 9/2006 | Stuart ................ G06F 16/122 711/159 |
| 7,287,048 | B2 * | 10/2007 | Bourbonnais ..... G06F 17/30566 |
| 7,600,086 | B2 | 10/2009 | Hochberg et al. |
| 7,703,125 | B2 | 4/2010 | Motoyama |
| 7,720,825 | B2 | 5/2010 | Pelletier et al. |
| 7,774,317 | B2 * | 8/2010 | Cannon ............... G06F 11/1451 707/609 |
| 7,831,567 | B2 * | 11/2010 | Luther .............. G06F 17/30368 707/663 |

(Continued)

FOREIGN PATENT DOCUMENTS

JP    H11-039199 A    2/1999

OTHER PUBLICATIONS

Patent Cooperation Treaty (PCT) International Search Report and Written Opinion in co-pending PCT International Appl. No. PCT/US2016/034283 (International Filing Date of May 26, 2016) dated Jul. 12, 2016 (10 pgs.).

(Continued)

*Primary Examiner* — Greta L Robinson
(74) *Attorney, Agent, or Firm* — Kraguljac Law Group, LLC (57) ABSTRACT

Systems, methods, and other embodiments associated with a data retention framework that enforces archive eligibility criteria beyond a simple retention period are described. In one embodiment, a method includes identifying a record that has been stored in a primary data store for at least a retention period prescribed for the record and evaluating the record to determine if archive eligibility criteria for the record are met. When the archive eligibility criteria is met, the record is marked as eligible for archiving. When the archive eligibility criteria is not met, the record is marked as not eligible for archiving.

20 Claims, 6 Drawing Sheets

(56) References Cited

U.S. PATENT DOCUMENTS

| | | | |
|---|---|---|---|
| 8,442,951 B1* | 5/2013 | Brannon | G06F 16/113 |
| | | | 707/673 |
| 8,452,741 B1 | 5/2013 | Kuhr | |
| 8,706,697 B2 | 4/2014 | Morsi et al. | |
| 8,782,009 B2 | 7/2014 | Shaath et al. | |
| 9,053,111 B2* | 6/2015 | Kau | G06Q 10/109 |
| 9,367,573 B1* | 6/2016 | Goyal | G06F 9/54 |
| 2006/0149796 A1 | 7/2006 | Aalmink | |
| 2007/0271308 A1 | 11/2007 | Bentley et al. | |
| 2008/0263108 A1 | 10/2008 | Herbst et al. | |
| 2008/0263297 A1* | 10/2008 | Herbst | G06F 17/30073 |
| | | | 711/161 |
| 2010/0106923 A1* | 4/2010 | Backa | G06F 12/16 |
| | | | 711/161 |
| 2011/0055559 A1 | 3/2011 | Li et al. | |
| 2011/0137869 A1* | 6/2011 | Coldicott | G06F 16/254 |
| | | | 707/661 |
| 2011/0145202 A1* | 6/2011 | Phyo | G06F 17/30011 |
| | | | 707/662 |
| 2012/0197845 A1* | 8/2012 | Kim | G06F 17/30221 |
| | | | 707/662 |
| 2013/0304707 A1* | 11/2013 | Herbst | G06F 17/30575 |
| | | | 707/667 |
| 2014/0025641 A1* | 1/2014 | Kumarasamy | G06F 17/30309 |
| | | | 707/661 |
| 2014/0304235 A1* | 10/2014 | Rooks | G06F 17/3007 |
| | | | 707/667 |
| 2016/0048522 A1* | 2/2016 | Wilcock | G06F 17/30073 |
| | | | 707/662 |

OTHER PUBLICATIONS

SAP, SAP Information Lifecycle Management to Reduce Business Risk and Costs, 2013, pp. 1-26; http://www.sap.com/bin/sapcom/da_dk/downloadasset.2009-09-sep-14-08.information-lifecycle-management-with-sap-software-pdf.html.

IBM, Understanding IBM FileNet Records Manager, pp. 1-436; http://www.redbooks.ibm.com/redbooks/pdfs/sg247623.pdf, 2009.

* cited by examiner

DATA RETENTION FRAMEWORK

BACKGROUND

In many industries, the increasing use of digitized data has similarly increased data processing volumes and retention rates. A data storage system can quickly become inefficient at processing data and costly in terms of storage hardware if aggressive archiving strategies are not implemented.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Most data storage systems, like database systems, that store data for a business concern have some sort of data management mechanism for deleting or archiving old records based on a retention policy. When a record is archived, it is moved from a primary data store (e.g., a transactional database) to a secondary data store (e.g., removable/transportable storage medium). The archived record may still be accessed, but access will require extra time and effort. Existing data management mechanisms rely on a retention period as the sole indicator of whether a record can be archived or not. However, there are usually other factors beyond a retention period that affect whether a given record can be archived without adversely affecting day to day operations.

Consider two different invoices that were created on the same day. The first invoice is paid in a timely manner and closed by the accounts payable clerk ninety days after it was created. The second invoice is disputed and becomes the basis of a lawsuit. The company's retention policy requires that the invoices must be stored for at least one year. If the first invoice is archived on its first birthday, it is very unlikely that anyone in the business will ever need to look at that invoice again. If the second invoice is archived on its first birthday, it is very likely that someone will need the invoice and have to take extra measures to access the invoice.

It can be seen that relying on a retention period as the sole indicator of whether a record can be archived can result in some "active" records being archived, causing inconvenience. In recognition of this, business people who set the retention period will tend to err on the side of a long retention period and may even resist enforcing any retention period at all, preferring to keep all records in primary storage. In the example above, the business person deciding the retention period may set a retention period of two years "just to be safe." If less than one percent of invoices are disputed, this means that 99 percent of invoices will be needlessly stored for an extra year in primary storage. A better retention period would be ninety days, but only if the archiving of active invoices could be prevented.

Systems and methods are described herein that provide a data retention framework in which, in addition to a retention period, business rules can be used to determine whether or not a particular record may be archived. In this manner, a minimum retention period can be selected to conserve storage space and any records that are defined by the business rules as still being active will be maintained in primary storage beyond the retention period until they are no longer active.

For the purposes of this description, an "old" record is a record that is in primary storage beyond its retention period. An "inactive" record is a record that meets some criteria (called archive eligibility criteria below) for records that are no longer being used by the business for normal operations. An "active" record is a record that does not meet these criteria. The systems and methods described herein archive old inactive records while maintaining old active records in primary storage.

Figure 1:
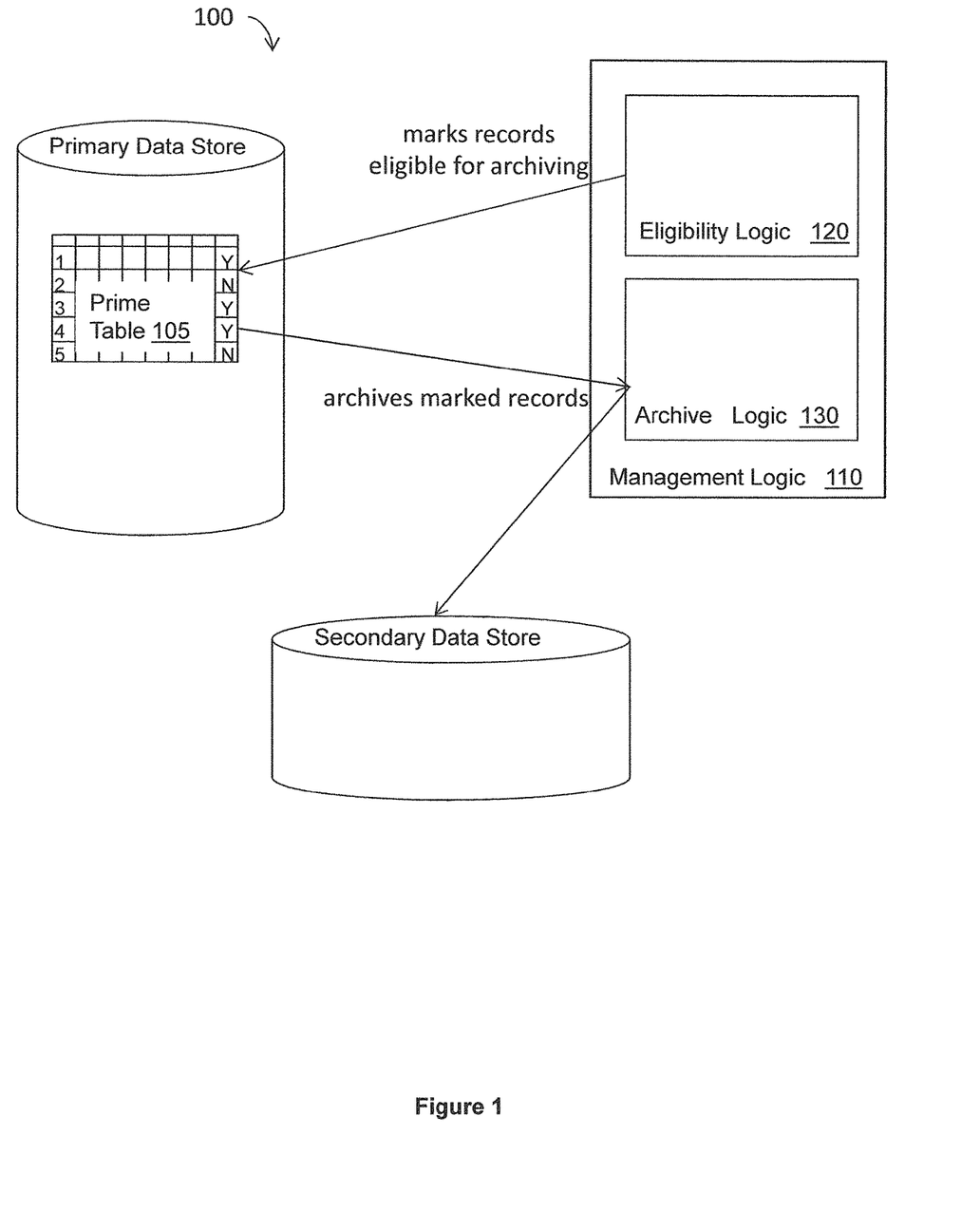
FIG. 1 illustrates one embodiment of a system associated with a data retention framework that applies business related archive criteria when archiving records.

FIG. 1 illustrates one embodiment of a system 100 that embodies a data retention framework in which business rules are used to define archive eligibility criteria that are applied to records prior to archiving. The system 100 includes a primary data store (e.g., database) with at least one prime table 105 that stores records that each describe one or more aspects of an instance of an object.

For example, the prime table 105 could store records for bills that have been issued by a business. Each bill is an instance of a bill object that has been defined by the business and has specified fields and segments. The record also has one or more status fields defined by the bill object's metadata that describe the bill's status as it moves through the business's billing process. The prime table 105 may not store data for every field or segment in a bill, but rather may store selected data that can be used as keys to other tables that contain additional fields, segments, and status fields of the bill. These other tables are not shown in FIG. 1, but would also be stored in the primary data store. Each record in the prime table 105 includes an identifier (numbers 1-5 in FIG. 1) that uniquely identifies a bill.

The system includes management logic 110 that identifies and archives old inactive records by moving the identified records from the primary data store to a secondary data store. The management logic 110 includes eligibility logic 120 and archive logic 130 that act independently of one another. The eligibility logic 120 identifies "old" records that have been stored beyond their retention period and then, for each old record, evaluates archive eligibility criteria that embody business rules to determine if it is "safe" to archive that particular record. If it is determined that an old record meets the archive eligibility criteria, eligibility logic 120 marks the record as being eligible for archiving. It can be seen that the last column in prime table 105 shows either a Y or N. Records marked Y are eligible for archiving.

The archive logic 130 acts independently of the eligibility logic 120 to archive records that have been marked as eligible for archiving. The archive logic 130 acts according to the business's retention policy to properly archive the marked records. Typically the archive logic 130 will move the marked records to a secondary data store that is less expensive but harder to access. However, in some embodiments, the archive logic 130 may delete marked records. The archive logic 130 may compress marked records. Because the archive logic 130 and the eligibility logic 120 are independent logics, the particular operation of the archive logic 130 does not affect the operation of the eligibility logic 120. In one embodiment, the eligibility logic 120 and/or the archive logic 130 are embodied as background processes such that operations performed by these logics are secondary to operations being performed on the data in the primary data store.

Figure 2:
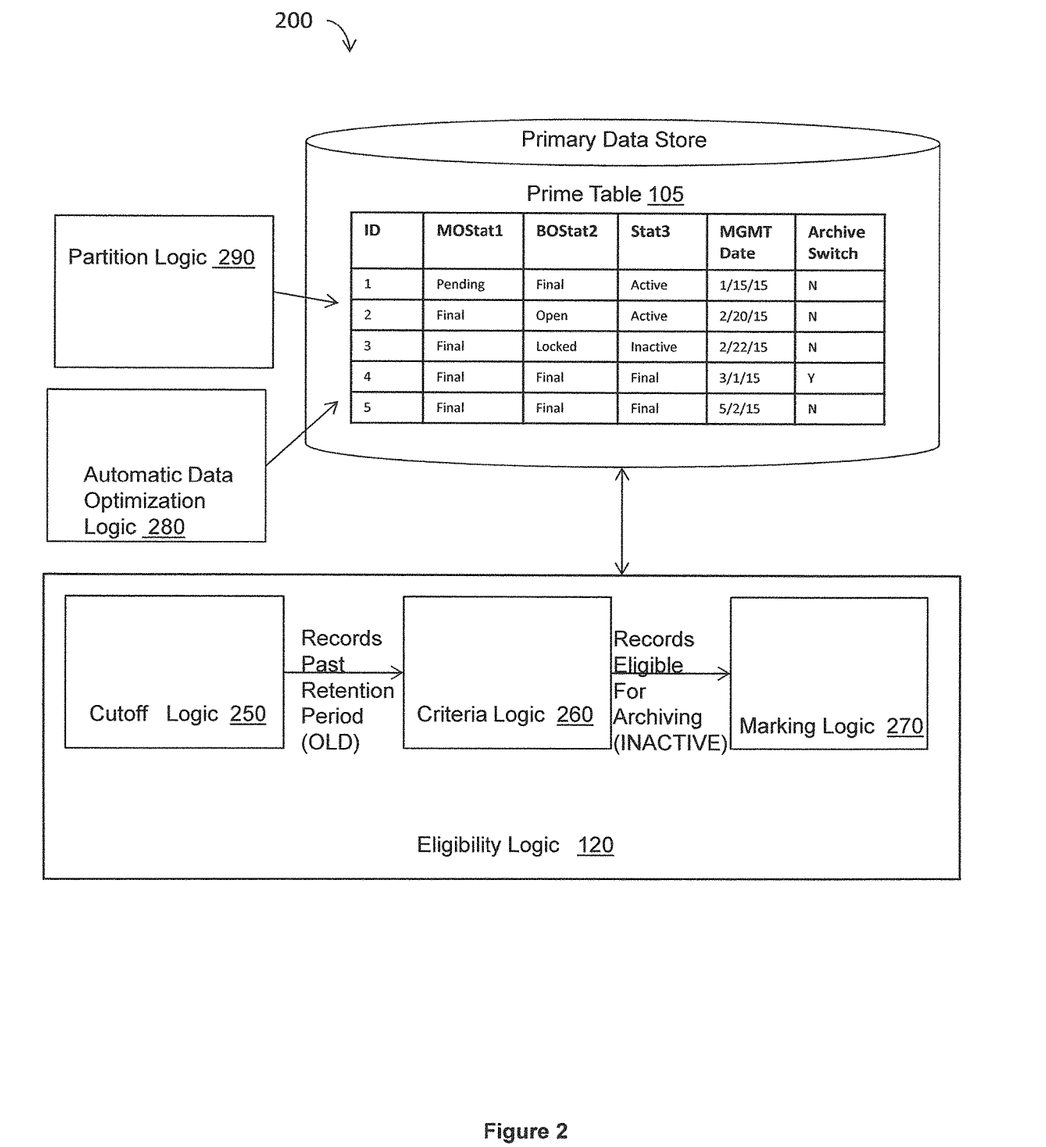
FIG. 2 illustrates another embodiment of a system associated with a data retention framework that applies business related archive criteria when archiving records.

FIG. 2 illustrates an example data retention system 200 that includes one embodiment of the eligibility logic 120. The prime table 105 is illustrated in more detail in FIG. 2. In the example table 105, each record has an identifier, three different status fields, a management date, and an archive switch value. The status fields are defined by the object's metadata. Example status fields might be different stages of a review process, payment status, project completion status, or the status of a business object that includes the instance described by the record. These status fields are used by other processes that act on the primary data store like an event manager and so on.

The management date is used as the start date for the record's retention period. Each object is assigned a retention period, as will be explained in more detail below. The management date is typically set as the record's creation or insertion date. However, because the management date is used only by the eligibility logic 120, the management date can be set to any value without affecting other processes acting on the record. This means that the actual retention period for a record may be extended or shortened by simply changing the record's management date. This allows a particular record to be exempted from the object's standard retention period without changing the retention period for other records. The management date may also be set to a predetermined value (e.g., SYSDATE) that exempts a record from the archive process altogether, meaning that the record will always remain in primary memory.

The archive switch value is set by default to N. When a record is determined to be eligible for archiving, the archive switch value is changed to Y. It can be seen that two columns have been added to the prime table 105 to support the data retention framework. No further modifications need be made to the prime table. This means that the prime table 105 itself can be managed in any number of ways to optimize storage in the primary data store. For example, partition logic 290 may partition the prime table on management date. This means that records in the same partition will have retention periods that end at about the same time. Once all of the records have been deemed eligible for archiving, the partition may be moved to secondary storage to await archiving.

Automatic data optimization (ADO) logic 280 may also take measures to conserve storage space for the prime table 105. For example, based on one or more of the status fields or some measure of how often a record is being accessed, the ADO might compress selected records while maintaining them in the prime table 105. For example, Record ID 5 might be a good candidate for compression because it has all three status fields set to Final. The eligibility logic 120 can de-compress the record to access the management date when screening the records for archive eligibility.

The eligibility logic 120 includes cutoff logic 250, criteria logic 260, and marking logic 270. The cutoff logic 250 identifies records in the prime table 105 that have been stored for more than the retention period, based on the records' respective management dates. The cutoff logic 250 calculates a "cutoff date" that divides old records from records that are still in the retention period. To calculate the cutoff date, the cutoff logic 250 accesses object metadata to determine what the retention period for the object is. The cutoff logic 250 subtracts the retention period from the current date (e.g., SYSDATE) to determine the cutoff date. For example, if the retention period is 3 months and today's date is May 15, 2015, the cutoff date is (May 15, 2015-3 months) or Jan. 15, 2015. Any record having a management date prior to Jan. 15, 2015 is identified by the cutoff logic 250 as being old, or beyond the retention period. Note that any record having a management date set to SYSDATE will never be older than the cutoff date, and thus will not be considered for archiving.

The criteria logic 260 applies archive eligibility criteria to the old records identified by the cutoff logic 250. The criteria logic 260 accesses object metadata to determine what archive eligibility criteria have been set for the object. For example, the archive eligibility criteria might specify that certain status fields need to be set to Final for the record to be deemed "inactive" and eligible for archiving.

One common archive eligibility criteria is that a business object that includes the instance described in the record under consideration has a Final status. The business object has a foreign key that is shared by records that are related to the business object. For example, when a business sells a pump, an order, an invoice, a packing slip, a shipment order, and so on may be generated. Each of these records is an instance of an object (e.g., an order object, an invoice object, and so on). A "sale" business object may be defined that includes all of the objects that are related to a given sale. Each record that describes the same sale will have a foreign key that is associated with the sale. Records describing the individual object instances (e.g., invoice, packing slip) will have an object status (called maintenance object or "MO" in FIG. 2) that describes the status of the particular object instance and also a "business object (BO) status" field that indicates the status of that record's business object. Thus, the order record will have an "order status" field that is Final once the order has been entered and a BO status field that will remain "open" until the order has been received, the invoice has been paid, and so on. The archive eligibility criteria may require that the BO status be Final before a record can be archived. This prevents archiving of a record whose own status is Final but that is related to some other record that is still active.

The marking logic 270 marks each record that the criteria logic 260 determines to have met the archive eligibility criteria as eligible for archiving. In the illustrated example, the marking logic 270 changes the value of the archive switch to Y. Note that the prime table 105 includes records that have the archive switch already set to Y. This is because changing the archive switch to Y does not mean that the record is immediately archived. The next time the archive logic 130 accesses the prime table 105 to locate records for archiving, the marked records will be archived by compressing the records, moving the records to secondary storage, deleting the records, and so on, as specified by the archive policy of the company. Archiving allows inactive records to be stored in a less expensive and/or less memory consuming manner.

In one embodiment, the management logic 110 is embodied as one or more batch processes or crawlers. A parent batch process initiates and controls individual crawlers for each object type. The parent process defines the parameters and a Java batch job controls the crawler processes. The parent process can be restarted. In case any server failure happens the parent process can be restarted and this will start all the crawler processes. If the crawlers are already running but a few of them are not, then if the parent process is restarted, then the crawlers that are not running will be started.

Each individual crawler is a child batch process which can either be started by the parent process or be submitted using standalone batch submission. The crawler batch control is named specific to the object that the crawler is going to consider for archive eligibility. The responsibility of each crawler is to determine if records of a particular object type can be marked as eligible to be archived. The crawlers get work from the parent process, which executes in the background. When a crawler gets work from the parent process, the crawler evaluates the records in the prime table based on the different status field values provided by archive eligibility criteria associated with the object type. Based on the status field values for each old record, the crawler sets the archive switch value to Y or leaves the value as N.

Figure 3:
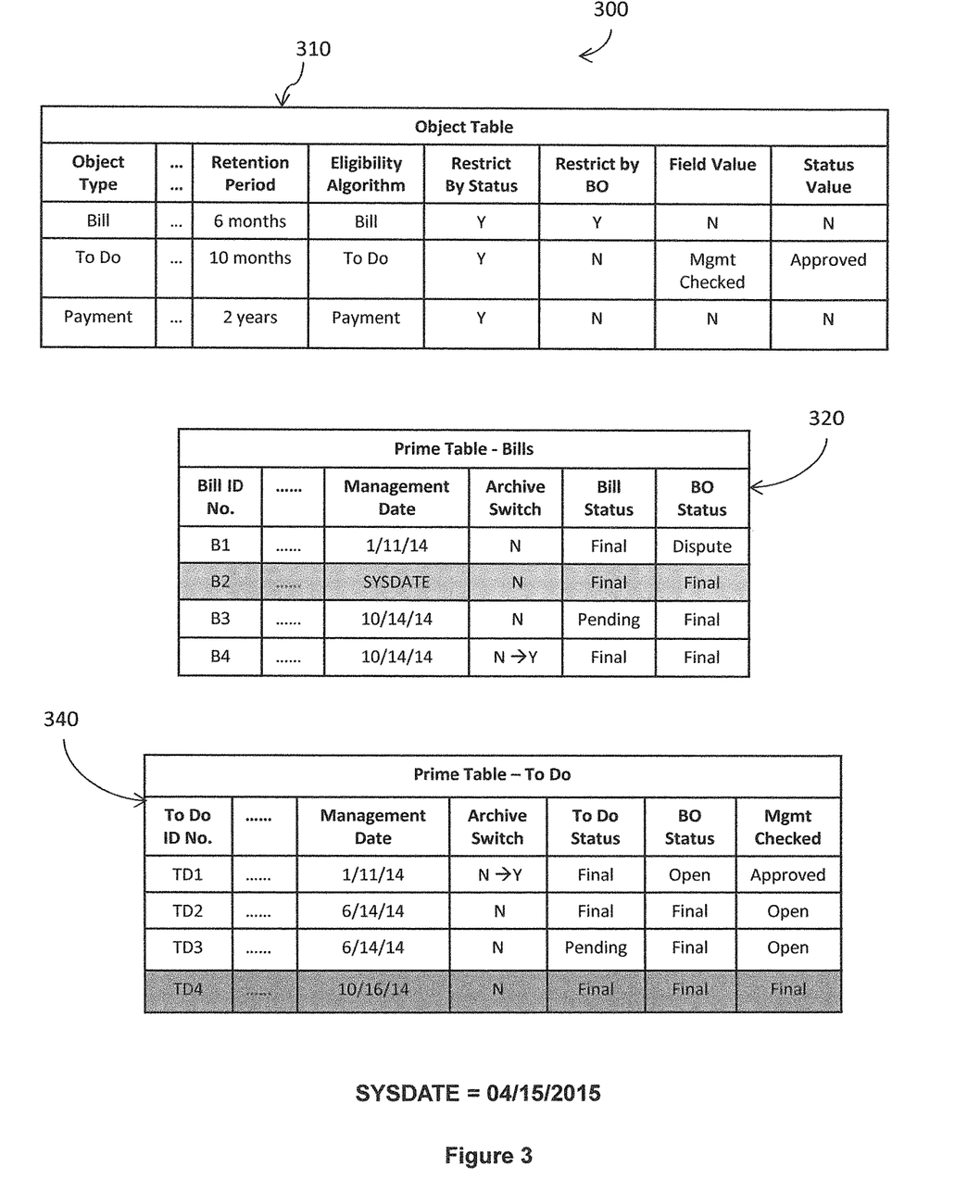
FIG. 3 illustrates an example of the system of FIG. 2 marking records as eligible for archiving.

FIG. 3 illustrates a set of tables that accompany an example of the management logic 120 setting archive switch values. An object table 310 stores metadata for objects. The columns in the object table 310 that are used to store archive option data that specifies the retention policy for each object are illustrated in FIG. 3. The object table will have other columns that are not shown. The object table 310 has columns that store a retention period, a selected eligibility algorithm (e.g., name of the particular archive eligibility crawler for the object), and selections for: restrict by status, restrict by BO status, field value and status value. Business retention rules for an object can be encoded in the object table by setting the different values in these columns for the object.

Referring to the object table 310, the user may specify the retention period for the object and select which eligibility algorithm should apply to the object. It can be seen that for bill objects, the retention period is six months and the eligibility algorithm (e.g., archive eligibility crawler) used for Bill records is called "Bill." If the restrict by status field is Y, then the archive eligibility criteria will require that the record's status field is Final before the record is marked as eligible for archiving. If the BO status field is Y, then the archive eligibility criteria will require that the record's BO status field is Final before the record is marked as eligible for archiving. It can be seen that for To Do objects, the record status is Y and the BO status is no. This means that it is not necessary for a To Do record's BO to be Final before the To Do record may be archived.

The field value column allows the user to select one or more fields that can be used as archive eligibility criteria. The status value is the value for the specified field that will meet the archive criteria. It can be seen that for To Do records, the Mgmt Checked field must have a value of "Approved" before the record may be archived.

By way of example, consider system date SYSDATE is Apr. 15, 2015 on which processing resources become available for the parent batch process to have the Bill and To Do archive eligibility crawlers analyze the prime tables to determine if any records are eligible for archiving. The Bill archive eligibility crawler calculates a cutoff date by accessing the object table to determine what the retention period is for Bill records and also to determine the archive eligibility criteria for Bill records. The retention period is six months and the archive eligibility criteria are that both the record and the business object status must be Final. The archive eligibility crawler calculates the cutoff date as (Apr. 15, 2015—6 months) or Oct. 15, 2014. Any record having a management date before Jan. 15, 2014 will be considered to be old by the crawler.

The Bill archive eligibility crawler accesses a prime table for Bills 320 and identifies the old records. Records B1, B3, and B4 are old while record B2 is not old because it has a management date of SYSDATE (it has been manually exempted from archiving). The archive eligibility crawler will not consider B2 for archive eligibility. For B1, the archive eligibility crawler determines that since the BO status field is not Final, B1 cannot be marked as eligible for archiving. For B3, the archive eligibility crawler determines that since the Bill Status is pending, B3 cannot be marked as eligible for archiving. For B4, both the Bill status and BO status are Final so the archive eligibility crawler marks B4 as eligible for archiving by setting the Archive Switch value to Y.

The To Do archive eligibility crawler calculates a cutoff date by accessing the object table to determine what the retention period is for To Do records and also to determine the archive eligibility criteria for To Do records. The retention period is ten months and the archive eligibility criteria are that the record status must be Final and that the Mgmt Checked status must be Approved.

The archive eligibility crawler calculates the cutoff date as (Apr. 15, 2015—10 months) or Jun. 15, 2014. Any record having a management date before Jun. 15, 2014 will be considered to be old by the crawler. The To Do archive eligibility crawler accesses a prime table for To Do records 340 and identifies the old records. Records TD1, TD2, and TD3 are old while record TD4 is not old because it has a management date after the cutoff date. The archive eligibility crawler will not consider TD4 for archive eligibility even though TD meets the archive eligibility criteria already. For TD1, the archive eligibility crawler determines that the To Do status field is Final and Mgmt Checked status field is Approved. The archive eligibility crawler marks TD1 as eligible for archiving by setting the Archive Switch value to Y. For TD2, the archive eligibility crawler determines that since the Mgmt Checked status is not Approved, TD2 cannot be marked as eligible for archiving. For TD3, since the To Do Status is not Final, the archive eligibility crawler does not mark TD3 as eligible for archiving.

When archiving is performed, the prime table is accessed and the marked records will be archived by compressing the records, moving the records to secondary storage, deleting the records, and so on, as specified by the archive policy of the company. Archiving allows inactive records to be stored in a less expensive and/or less memory consuming manner. Providing additional archiving criteria beyond simple expiration of a retention period allows the retention period to be set to a shorter period of time so that many "routine" records can be archived earlier and the few records that remain active due to some special reason will be maintained in primary memory. This saves memory and improves processing time.

Figure 4:
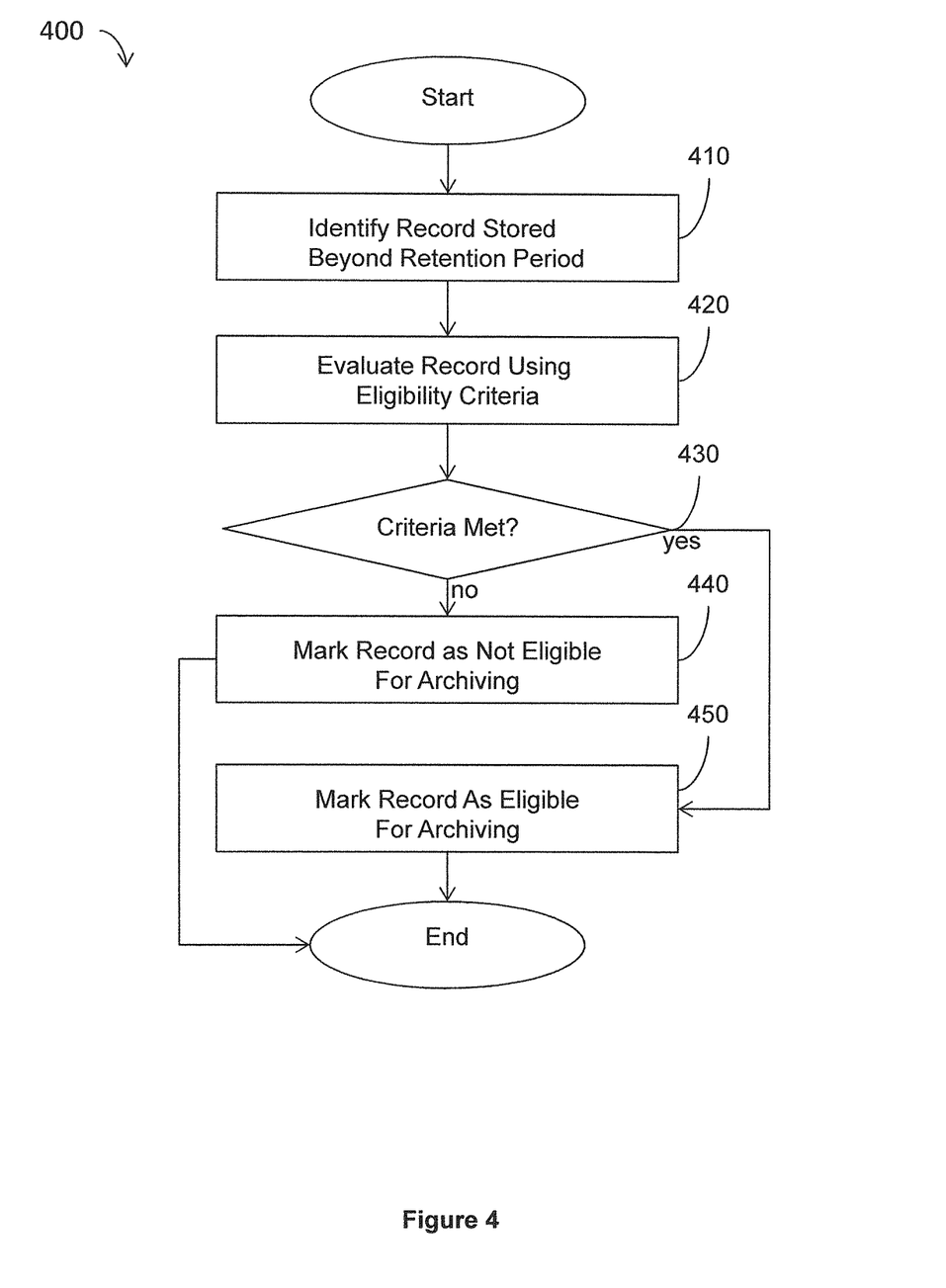
FIG. 4 illustrates an embodiment of a method associated with a data retention framework that applies business related archive criteria when archiving records.

FIG. 4 illustrates an example method 400 that marks records that have been stored for a retention period as eligible for archiving when archive eligibility criteria. The method 400 may be performed by the management logic 110 of FIGS. 1 and/or 2. The method 400 includes, at 410, identifying a record that has been stored in a primary data store for at least a retention period prescribed for the record. At 420, the method includes evaluating the record to determine if archive eligibility criteria for the record are met.

At 430, when the archive eligibility criteria is met, the method proceeds to 450 and the record is marked as eligible for archiving. At 430, when the archive eligibility criteria is not met, the method proceeds to 440 and the record is not marked as eligible for archiving. Thus, the method 400 refrains from marking as eligible those records that do not meet the archive eligibility criteria in the primary data store even though the records have may have been stored for longer than the retention period.

When archiving is performed, the prime table is accessed and the marked records will be archived by compressing the records, moving the records to secondary storage, deleting the records, and so on, as specified by the archive policy of the company. Archiving allows inactive records to be stored in a less expensive and/or less memory consuming manner. As outlined in FIG. 4, enforcing additional archiving criteria beyond simple expiration of a retention period allows the retention period to be set to a shorter period of time so that many "routine" records can be archived earlier and the few records that remain active due to some special reason will be maintained in primary memory. This saves memory and improves processing time.

Figure 5:
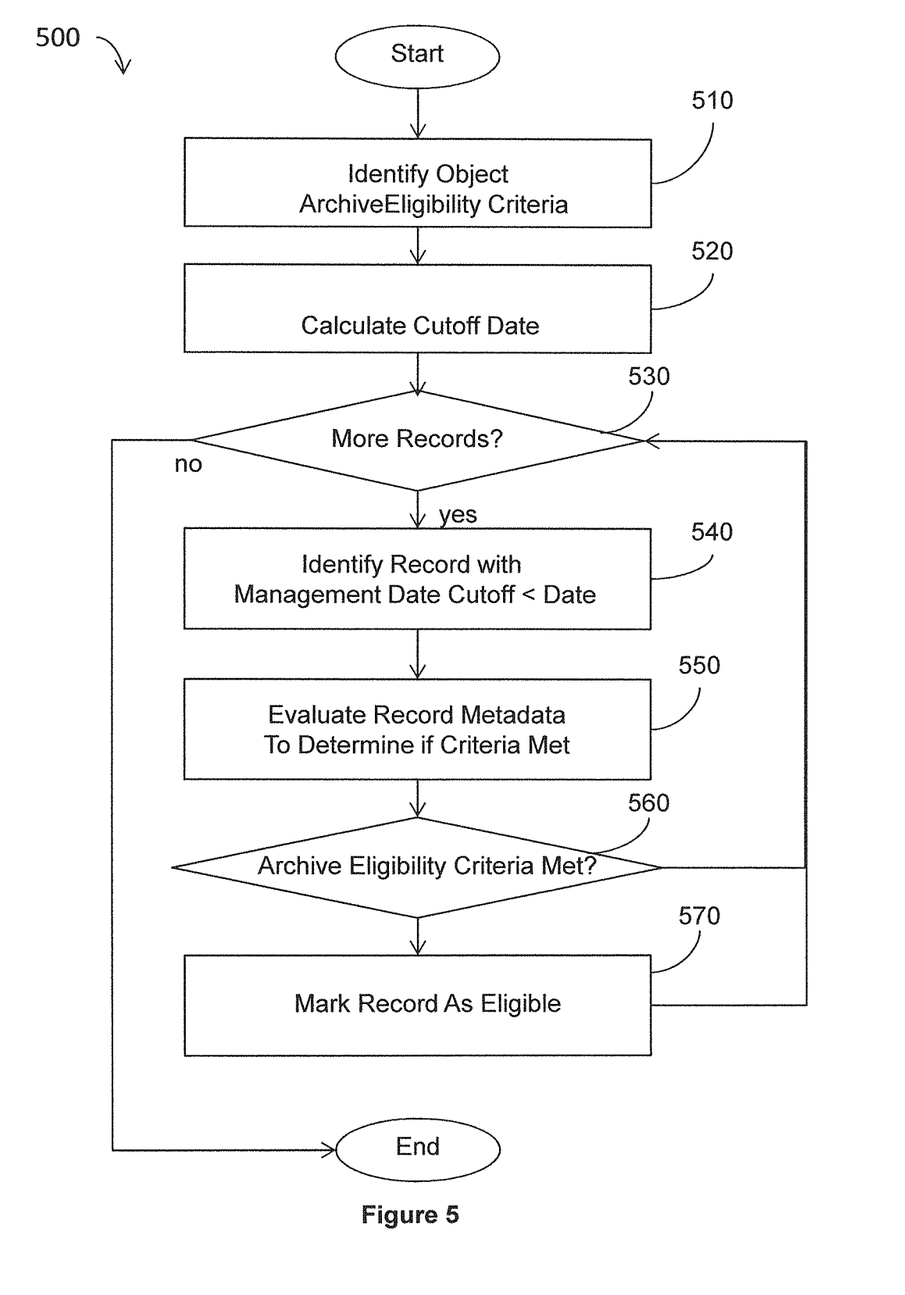
FIG. 5 illustrates another embodiment of a method associated with a data retention framework that applies business related archive criteria when archiving records.

FIG. 5 illustrates one example embodiment of a method 500 for selecting and marking records that meet archive eligibility criteria so that the records may be identified and archived by an archive process. The method 500 may be performed by the management logic 110 of FIGS. 1 and/or 2. At 510, archive eligibility criteria are identified. In one embodiment, each record is an instance of an object and includes one or more status field values and archive option data is stored in metadata for the object. At 510, the metadata is accessed to identify a combination of status field values that corresponds to the archive eligibility criteria. In one embodiment, one of the status fields corresponds to a status for a business object that includes the record and one or more records related to the record.

At 520, a cutoff date is calculated. In one embodiment, the record stores a management date for the record and the cutoff date is calculated by determining the present date; identifying an object retention period associated with the object; and calculating a cutoff date for the record by subtracting the retention period from the present date. In one embodiment, the object retention period is stored with the archive option data in metadata for the object.

At 530, the method accesses a prime table and determines if all records in the prime table have been evaluated. If so, the method ends. If not, at 540 a next record with a management date prior to the cutoff date and that is not already marked as archive eligible is identified. In one embodiment, this is performed by parsing a data structure storing the prime table to identify records having a management date prior to the cutoff date. At 550, the method includes evaluating the record to determine if archive eligibility criteria are met. In one embodiment this is performed by analyzing the record to determine if the status field values meet the archive eligibility criteria.

At 560, when the archive eligibility criteria are met the method proceeds to 570 and the record is marked as eligible for archiving. In one embodiment, the record is marked as eligible for archiving by setting an eligibility value in a field of the record to a value that is recognizable by an archiving process as indicating that the record is eligible is archiving. The method 500 then returns to 530 and a determination is made as to whether there are more old records in the prime table that have not been evaluated. If the archive eligibility criteria is not met at 560, the record is not marked and the method 500 returns to 530 and a determination is made as to whether there are more old records in the prime table that have not been evaluated.

In one embodiment, the methods 400 and/or 500 are performed by a background process such as a crawler, a batch process, a background thread, and so on that has a lower priority than operations being performed on records in the primary data store.

Archiving allows inactive records to be stored in a less expensive and/or less memory consuming manner. As outlined in FIG. 5, enforcing additional archiving criteria beyond simple expiration of a retention period allows the retention period to be set to a shorter period of time so that many "routine" records can be archived earlier and the few records that remain active due to some special reason will be maintained in primary memory. This saves memory and improves processing time.

It can be seen from the foregoing description that the data retention framework allows additional business-related criteria to be enforced before a record is archived. The framework facilitates setting retention periods to a minimum period because records that are still active, or related to active records, can be prevented from being archived after the retention period. The marking of records as eligible for archiving can be done by a background process that does not interfere with normal data system operation. Each object may be assigned a specific retention period and archive eligibility criteria. Individual records can be exempted from the retention period and/or be prevented from ever being archived.

In one embodiment, the system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the system is a centralized server-side application that provides at least the functions disclosed herein and that is accessed by many users via computing devices/terminals communicating with the system 100 (functioning as the server) over a computer network.

In one embodiment, one or more of the components described herein are configured as program modules stored in a non-transitory computer readable medium. The program modules are configured with instructions that when executed by at least a processor cause the computing device to perform the corresponding function(s).

Computing Device Embodiment

Figure 6:
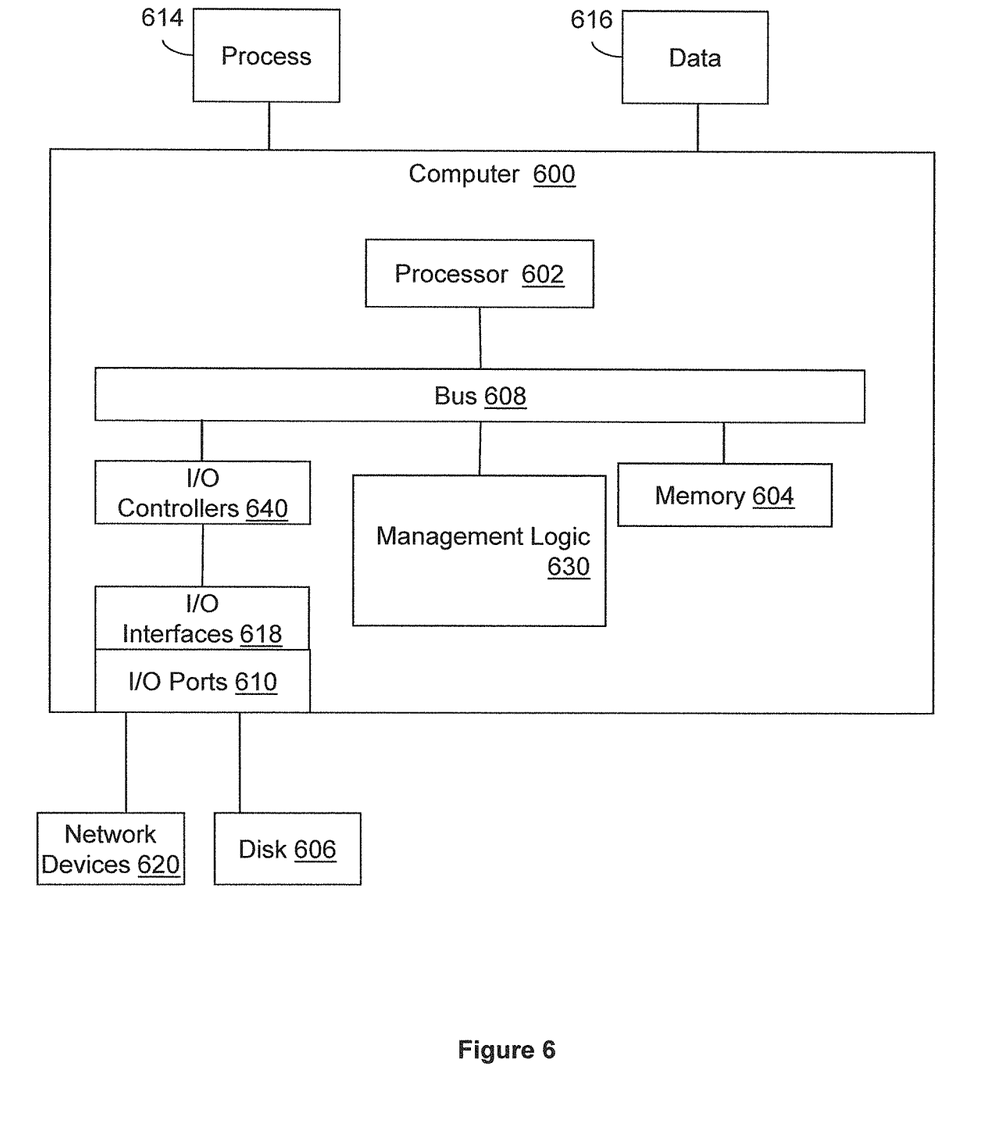
FIG. 6 illustrates an embodiment of a computing system configured with the example systems and/or methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include management logic 630 configured to facilitate a data retention framework that enforces archive eligibility criteria on records prior to marking the records as eligible for archiving, similar to the management logic 110 shown in FIGS. 1 and 2 and further explained in FIG. 3. In different examples, the logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform methods 400 and/or 500 of FIGS. 4 and 5, respectively and further explained in FIG. 3. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing the methods 400 and/or 500 of FIGS. 4 and 5, respectively and further explained in FIG. 3.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a compact disk-read only memory (CD-ROM) drive, a CD recordable (CD-R) drive, a CD read/write (CD-RW) drive, a digital video disc (DVD) ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and universal serial bus (USB) ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable storage medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer-readable storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable storage medium storing computer-executable instructions that when executed by a computer including at least one processor cause the computer to:
   identify a record that has been stored in a primary data store for at least a retention period prescribed for the record;
   evaluate the record to determine if at least one business related criterion for the record is met, wherein the record includes at least one business status field that indicates whether the at least one business related criterion for the record is met or is not met, and the at least one business related criterion is unrelated to the retention period;
   when both (i) the retention period for the record has expired and (ii) the at least one business related criterion is met based on the at least one business status field, mark the record as eligible for archiving to cause the record to be moved from the primary data store to a secondary data store; and
   when the retention period for the record has expired and the at least one business related criterion is not met based on the at least one business status field, maintain the record in the primary data store by marking the record as not eligible for archiving.

2. The non-transitory computer-readable storage medium of claim 1, where the instructions for marking the record as eligible for archiving comprise instructions that when executed by the at least one processor cause the at least one processor to set an eligibility value in a field of the record to a value that is recognizable by an archiving process as indicating that the record is eligible for archiving.

3. The non-transitory computer-readable storage medium of claim 1, where the record is an instance of an object, where the record stores a management date for the record, and where the instructions for identifying the record that has been stored in the primary data store for at least the retention period comprise instructions that when executed by the at least one processor cause the at least one processor to:
   determine a present date;
   identify an object retention period associated with the object; and
   calculate a cutoff date for the record by subtracting the retention period from the present date; and
   determine that the management date is prior to the cutoff date that indicates the retention period has expired.

4. The non-transitory computer-readable storage medium of claim 3, where the record is stored in a table, and where the record comprises a field that stores the management date and further where the instructions comprise instructions for partitioning the table on the management date.

5. The non-transitory computer-readable storage medium of claim 1, where the record is an instance of an object and where the at least one business status field for the record includes one or more status field values, where the instructions for evaluating the record comprise instructions for:
   accessing archive option data stored in metadata for the object that specifies a combination of the status field values that corresponds to determining that the at least one business related criterion is met; and
   analyzing the record to determine if the status field values meet the at least one business related criterion.

6. The non-transitory computer-readable storage medium of claim 5, where the business status field corresponds to a status for a business object that includes the record and one or more records related to the record.

7. The non-transitory computer-readable storage medium of claim 1, further comprising instructions that when executed by the at least one processor cause the at least one processor to identify a plurality of records in the primary data store that are marked for archiving and archive the marked records in the secondary data store.

8. A computing system, comprising:
   at least one processor connected to at least one memory;
   at least one non-transitory computer readable medium including stored instructions that are executable by the at least one processor, wherein the stored instructions are configured to include:
      cutoff logic configured to identify a record that has been stored in a primary data store for at least a retention period prescribed for the record;
      eligibility logic configured to evaluate the record to determine if at least one business related criterion for the record is met, wherein the record includes at least one business status field that indicates whether the at least one business related criterion included for the record is met or is not met, and the at least one business related criterion is unrelated to the retention period; and
      marking logic configured to:
         mark the record as eligible for archiving when both (i) the retention period for the record has expired and (ii) the at least one business related criterion is met, to cause the record to be moved from the primary data store to a secondary data store; and
         not mark the record as eligible for archiving when the retention period for the record has expired and the at least one business related criterion is not met, to maintain the record in the primary data store.

9. The computing system of claim 8, where the marking logic is configured to mark the record as eligible for archiving by setting an eligibility value in a field of the record to a value that is recognizable by an archiving process as indicating that the record is eligible for archiving.

10. The computing system of claim 8, where the record is an instance of an object, where the record stores a management date for the record, and where the cutoff logic is configured to determine that the record has been stored in the primary data store for at least the retention period by:
   determining a present date;
   identifying an object retention period associated with the object; and
   calculating a cutoff date for the record by subtracting the retention period from the present date; and
   determining that the management date is prior to the cutoff date which indicates the retention period has expired.

11. The computing system of claim 8, where the record is an instance of an object and wherein the at least one business status field for the record includes one or more status field values, and where the eligibility logic is configured to:
   access archive option data stored in metadata for the object that specifies a combination of the status field values that corresponds to determining that the at least one business related criterion is met; and
   analyze the record to determine if the status field values meet the at least one business related criterion.

12. The computing system of claim 11, where the at least one business status field corresponds to a status for a business object that includes the record and one or more records related to the record.

13. The computing system of claim 11, where one or more of the cutoff logic, eligibility logic, and marking logic comprise a background process that has a lower priority than operations being performed on records in the primary data store.

14. A computer-implemented method performed by a computing system including at least one processor, the method comprising:
   identifying a record that has been stored in a primary data store for at least a retention period prescribed for the record;
   evaluating the record to determine if at least one business related criterion for the record is met, wherein the record includes at least one business status field that indicates whether the at least one business related criterion for the record is met or is not met, and the archive at least one business related criterion is unrelated to the retention period;
   when both (i) the retention period for the record has expired and (ii) the at least one business related criterion is met based on the at least one business status field, marking the record as eligible for archiving to cause the record to be moved from the primary data store to a secondary data store; and
   when the retention period for the record has expired and the at least one business related criterion is not met, marking the record as not eligible for archiving to maintain the record in the primary data store.

15. The computer-implemented method of claim 14, where marking the record as eligible for archiving comprises setting an eligibility value in a field of the record to a value that is recognizable by an archiving process as indicating that the record is eligible is archiving.

16. The computer-implemented method of claim 14, where the record is an instance of an object, where the record stores a management date for the record, and where identifying the record that has been stored in the primary data store for at least the retention period comprises:
   determining a present date;
   identifying an object retention period associated with the object; and
   calculating a cutoff date for the record by subtracting the retention period from the present date; and
   determining that the management date is prior to the cutoff date which indicates the retention period has expired.

17. The computer-implemented method of claim 16, where the record is stored in a table, and where the record comprises a field that stores the management date and where the method further comprises partitioning the table on the management date.

18. The computer-implemented method of claim 14, where the record is an instance of an object and where the at least one business status field for the record includes one or more status field values, and where evaluating the record comprises:
   accessing archive option data stored in metadata for the object that specifies a combination of the status field values that corresponds to determining that the at least one business related criterion is met; and
   analyzing the record to determine if the status field values meet the at least one business related criterion.

19. The computer-implemented method of claim 18, where the business status field corresponds to a status for a business object that includes the record and one or more records related to the record.

20. The computer-implemented method of claim 14, further comprising archiving marked records.

* * * * *

UNITED STATES PATENT AND TRADEMARK OFFICE
CERTIFICATE OF CORRECTION

PATENT NO. : 10,783,113 B2  
APPLICATION NO. : 14/736443  
DATED : September 22, 2020  
INVENTOR(S) : Shorten et al.

Page 1 of 1

It is certified that error appears in the above-identified patent and that said Letters Patent is hereby corrected as shown below:

In the Drawings

On sheet 5 of 6, in Figure 5, under Reference Numeral 510, Line 2, delete "ArchiveEligibility" and insert -- Archive Eligibility --, therefor.

In the Specification

In Column 4, Line 53, delete "Thisprevents" and insert -- This prevents --, therefor.

In Column 6, Line 10, delete "Jan." and insert -- Oct. --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*